United States Patent
Xu (10) Patent No.: US 9,635,639 B2
(45) Date of Patent: Apr. 25, 2017

(54) PAGING INDICATOR TRANSMISSION METHOD, SYSTEM AND RECEPTION DEVICE FOR MOBILE COMMUNICATION SYSTEM

(71) Applicant: MStar Semiconductor, Inc., Hsinchu Hsien (TW)

(72) Inventor: Hu-Jian Xu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 174 days.

(21) Appl. No.: 14/132,348

(22) Filed: Dec. 18, 2013

(65) Prior Publication Data

US 2014/0171092 A1    Jun. 19, 2014

(30) Foreign Application Priority Data

Dec. 18, 2012  (CN) .......................... 2012 1 0549505

(51) Int. Cl.
*H04W 72/00* (2009.01)
*H04W 68/02* (2009.01)
*H04W 52/02* (2009.01)

(52) U.S. Cl.
CPC ....... *H04W 68/02* (2013.01); *H04W 52/0216* (2013.01); *Y02B 60/50* (2013.01)

(58) Field of Classification Search
CPC ..... H04W 88/06; H04W 72/04; H04W 68/00; H04W 4/14; H04M 1/72519
USPC ................... 455/426.1, 450, 458, 466, 550.1
See application file for complete search history.

(56) References Cited

U.S. PATENT DOCUMENTS

| 6,259,744 B1* | 7/2001 | Lee et al. ....................... 375/264 |
| 2001/0008838 A1* | 7/2001 | Toskala et al. ............... 455/458 |
| 2007/0206524 A1* | 9/2007 | Suk .................... H04B 1/70754 370/320 |

(Continued)

FOREIGN PATENT DOCUMENTS

CN           102547930 A  *  7/2012 ............ H04W 52/02

OTHER PUBLICATIONS

Taiwan Intellectual Property Office, "Office Action", Apr. 1, 2010.
(Continued)

*Primary Examiner* — Anthony Addy
*Assistant Examiner* — Matthew Genack
(74) *Attorney, Agent, or Firm* — WPAT, PC; Justin King; Douglas A. Hosack (57) ABSTRACT

A paging indicator transmission method for a mobile communication system includes the following steps. In step S1, a set of terminals are paged by grouping paging indicators, and paging indicators PCH of the terminals are carried by paging indicator channels PICH. The paging indicator channel PICH of each cell utilizes the same burst structure, and the paging indicators PCH are located at known locations at one side or two sides of a training sequence and are coded by repeated coding. In step S2, the terminal controls its RF component to receive data. The received data includes the training sequence in the timeslot where the paging indicator channel PICH is located, one or two paging indicators corresponding to the terminal, and data between the training sequence and the one or two paging indicators corresponding to the terminal.

14 Claims, 6 Drawing Sheets

(56) References Cited

U.S. PATENT DOCUMENTS

2008/0232289 A1* 9/2008 Willey .................... 370/311
2010/0081454 A1 4/2010 Wang et al.

OTHER PUBLICATIONS

3rd Generation Partnership Project (3GPP), "Physical Channels and Mapping of Transport Channels onto Physicals Channels (TDD)", Sep. 2012.

* cited by examiner

FIG. 4 paging indicator location corresponding to terminal    paging indicator location corresponding to terminal data1    data2

FIG. 5 paging indicator location corresponding to terminal    paging indicator location corresponding to terminal data1    data2

FIG. 6 paging indicator location corresponding to terminal    paging indicator location corresponding to terminal data1    data2

PAGING INDICATOR TRANSMISSION METHOD, SYSTEM AND RECEPTION DEVICE FOR MOBILE COMMUNICATION SYSTEM

This application claims the benefit of People's Republic of China application Serial No. 201210549505.4, filed Dec. 18, 2012, the subject matter of which is incorporated herein by reference.

BACKGROUND OF THE INVENTION

Field of the Invention

The invention relates in general to a paging indicator transmission system of a mobile communication technology, and more particularly to a paging indicator transmission method, system and reception device for a mobile communication system.

Description of the Related Art

Manufacturers constantly strive in reducing power consumption and prolonging a standby period of a wireless terminal in a wireless communication system. When a terminal is in a standby mode, the power consumption of the terminal is chiefly allotted for intermittently receiving paging messages through a network, and the power consumption of a radio frequency (RF) device account for a large portion of such power consumption. Therefore, by reducing operating time of the RF component, the power consumption in the standby mode can be reduced to prolong the standby period.

To fully utilize wireless resources, a network pages a set of terminals according to paging indicators in a grouped manner. For a particular terminal, a precise position of the paging indicator in the set may be obtained from system broadcast messages. To increase the reliability of paging indicators and reduce the probability of missing paging indicators, paging indicators in a system are coded by a repeated coding method. That is, paging indicators of terminals are set to the same position in different timeslots where paging indicator channels (PICH) are located in a time period, so that a preferred solution for receiving paging indicators can be achieved.

SUMMARY OF THE INVENTION

The invention is directed to a paging indicator transmission method for a mobile communication system to reduce the reception of unnecessary information, operating time of an RF component and standby power consumption of a terminal, and to prolong a standby period.

The present invention further provides a paging indicator transmission system for a mobile communication system to reduce the reception of unnecessary information, operating time of an RF component and standby power consumption of a terminal, and to prolong a standby period.

The present invention further provides a paging indicator reception device for a mobile communication system to reduce the reception of unnecessary information, operating time of an RF component and standby power consumption of a terminal, and to prolong a standby period.

A paging indicator transmission method for a mobile communication system includes the following steps. In step S1, a set of terminals are paged by grouping paging indicators, and paging indicators PCH of the terminals are carried by paging indicator channels PICH. The paging indicator channel PICH of each cell utilizes the same burst structure, and the paging indicators PCH are located at known locations at one side or two sides of a training sequence and are coded by repeated coding to appear in different timeslots where the paging indicator channels are located in a set time period. The training sequence is used for channel estimation. In step S2, the terminal controls its RF component to receive data. The received data includes the training sequence in the timeslot where the paging indicator channel PICH is located, one or two paging indicators corresponding to the terminal, and data between the training sequence and the one or two paging indicators corresponding to the terminal.

A paging indicator transmission system for a mobile communication system includes a transmission device and a reception terminal. The transmission device pages a set of terminals by grouping paging indicators, and carries a paging indicator PCH of each terminal by a paging indicator channel PICH. The paging indicator channel PICH of each cell utilizes the same burst structure, the paging indicators PCH are located at known locations at one side or two sides of a training sequence and are coded by repeated coding to appear in different timeslots where the paging indicator channel PICH is located in a set time period. The training sequence is used for channel estimation. The reception terminal includes an RF component and a reception control unit. The reception control unit controls the RF component to intermittently receive paging messages sent by the transmission device. The received data includes the training sequence in the timeslot where the paging channel PICH is located, one or two paging indicators corresponding to the terminal, and data between the training sequence and the one or two paging indicators corresponding to the terminal.

A paging indicator reception device for a mobile communication system includes an RF component and a reception control unit. The reception control unit controls the RF component to intermittently receive paging messages sent by the transmission device. The paging messages are from a network, and are carried on a paging indicator channel. The received data includes a training sequence in a timeslot where a paging channel PICH is located, one or two paging indicators corresponding to the terminal, and data between the training sequence and the one or two paging indicators corresponding to the terminal.

In the paging indicator transmission method and system for a mobile communication system disclosed by the present invention, characteristics of distribution and repeated coding of paging information in paging timeslots, known to a terminal, are repeated utilized to reduce the reception of unnecessary information, thereby reducing an operating time of the RF component and power consumption of the terminal as well as prolonging a standby period.

The above and other aspects of the invention will become better understood with regard to the following detailed description of the preferred but non-limiting embodiments. The following description is made with reference to the accompanying drawings.

DETAILED DESCRIPTION OF THE INVENTION

First Embodiment

Figure 1:
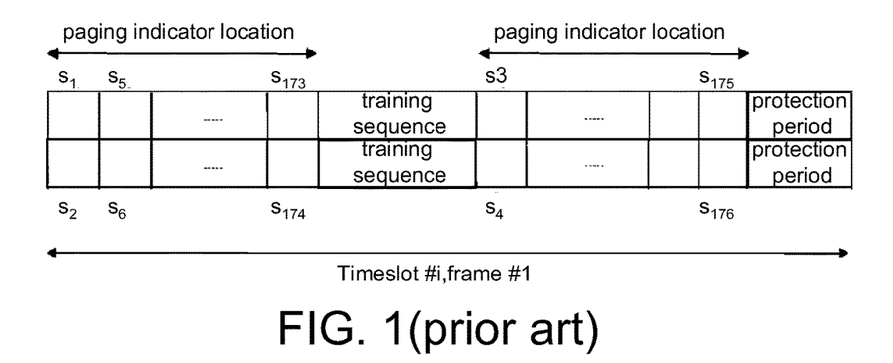
FIG. 1 is a schematic diagram of a burst structure of a paging indicator channel PICH in a time division synchronous code division multiple access (TD-SCDMA) system.
Figure 2:
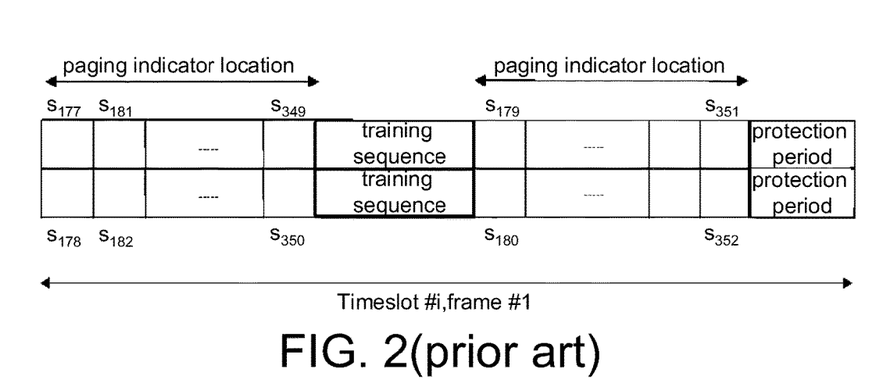
FIG. 2 is another schematic diagram of a burst structure of a paging indicator channel PICH in a TD-SCDMA system.

In the first embodiment, a time division synchronous code division multiple access (TD-SCDMA) system is taken as an example for explaining the present invention. According to the 3GPP TS 25.221 specifications, "Transport Channels and Physical Channels" defines a burst structure of a paging indicator channel (PICH), and numbers of paging indicators in the burst structure (also referred as paging indicator bits) of the paging indicator channel PICH, as shown in FIGS. 1 and 2, where i∈{0, 2, 3, 4, 5, 6}. Meanwhile, a length of the paging indicators is also regulated to be 2, 4 or 8 bits, with each paging indicator Pq(P1, q=0, . . . , NPI-1, Pq∈{0, 1}) mapping to a bit $\{S_{2LPI*q+1}, \ldots, S_{2LPI*(q+1)}\}$ in a wireless frame.

A mapping relationship of paging indicators is as shown in Table-1.

TABLE 1

Mapping relationship table of paging indicators

| Pq | Bit{s2LPI * q + 1, . . . , s2LPI * (q + 1)} | Description |
|---|---|---|
| 0 | {0, 0, . . . , 0} | No need to receive PCH |
| 1 | {1, 1, . . . , 1} | Need to receive PCH |

Figure 3:
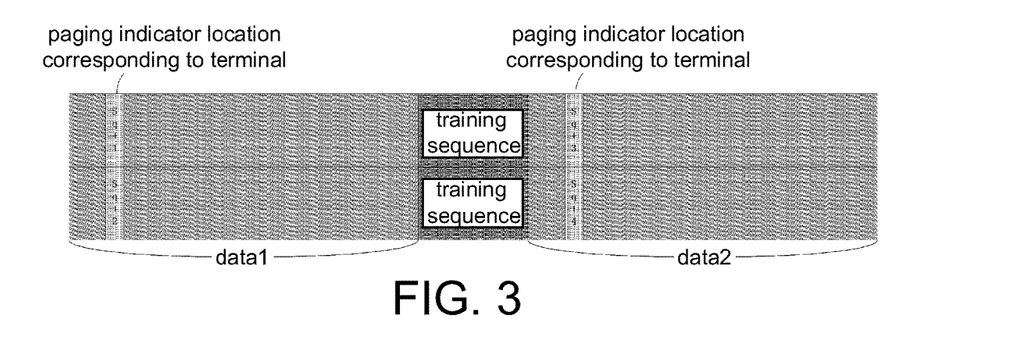
FIG. 3 is a schematic diagram of a system receiving an entire timeslot where a paging indicator channel PICH is located.

Taking LPI=2 for example, in a current reception approach, a terminal receives an entire timeslot where the PICH is located, as shown in FIG. 3. In the present invention, a terminal only receives a part of data of an entire timeslot where the PICH is located. Such part of data includes data "data1", data "data2", and a training sequence "midamble" between data1 and data2.

Figure 4:
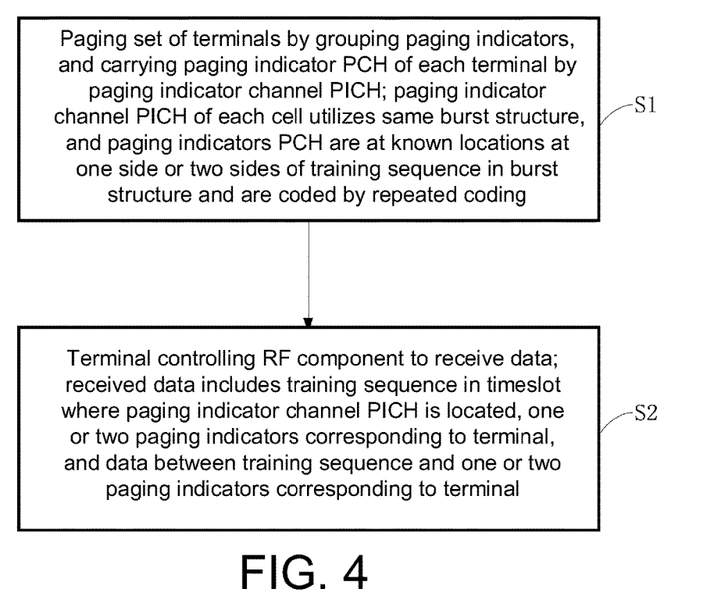
FIG. 4 is a flowchart of a paging indicator transmission method according to an embodiment of the present invention.

Referring to FIG. 4, a paging indicator transmission method for a mobile communication system disclosed by the present invention includes the following steps.

In step S1, a set of terminals are paged by grouping paging indicators, and paging indicators PCH of the terminals are carried by paging indicator channels PICH. The paging indicator channel PICH of each cell utilizes the same burst structure, and the paging indicators PCH are located at known locations at one side or two sides of a training sequence and are coded by repeated coding (i.e., in a set period, a position of the paging indicator of each terminal is at a same location in different timeslots where the paging indicator channels are located). The training sequence is used for channel estimation.

In step S2, the terminal controls its RF component to receive data. The received data includes the training sequence in the timeslot where the paging indicator channel PICH is located, one or two paging indicators corresponding to the terminal, and data between the training sequence and the one or two paging indicators corresponding to the terminal. The data may be received in three approaches in step S2, with associated details to be described below.

Figure 5:
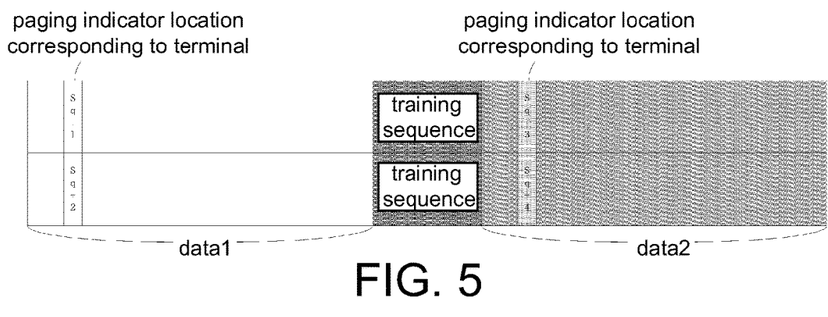
FIG. 5 is a schematic diagram of a first reception approach in a paging indicator transmission method according to an embodiment of the present invention.

In the first reception approach, the data received is as indicated by a shaded part in FIG. 5. The data received by the RF component of the terminal is the training sequence "midamble" in the timeslot where the paging indicator channel PICH is located, and all the data at one side of the training sequence "midamble". For example, the received data is the training sequence "midamble" and data "data1", or the training sequence "midamble" and the data "data2", as shown in FIG. 5.

Figure 6:
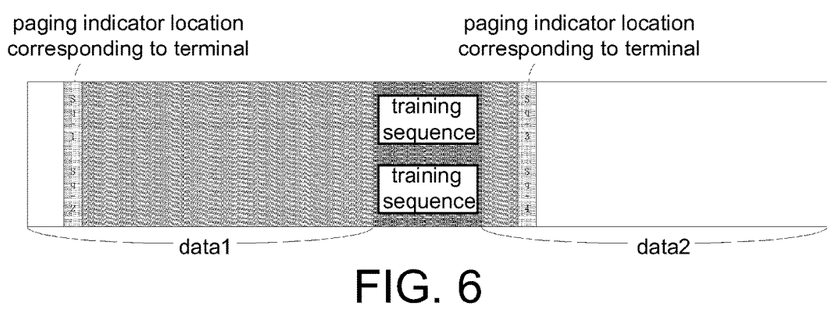
FIG. 6 is a schematic diagram of a second reception approach in a paging indicator transmission method according to an embodiment of the present invention.

In the second reception approach, the data received is as indicated by a shaded part in FIG. 6. The data received by the RF component of the terminal is two paging indicators, corresponding to the terminal, in the timeslot where the paging indicator channel PICH is located, and all the data between the two paging indicators, including the training sequence "midamble" in the timeslot where the paging indicator channel PICH is located. That is, the received data is the training sequence "midamble" in the timeslot where the paging indicator channel PICH is located, the two paging indicators corresponding to the terminal, and the data between the training sequence and the two paging indicators.

Figure 7:
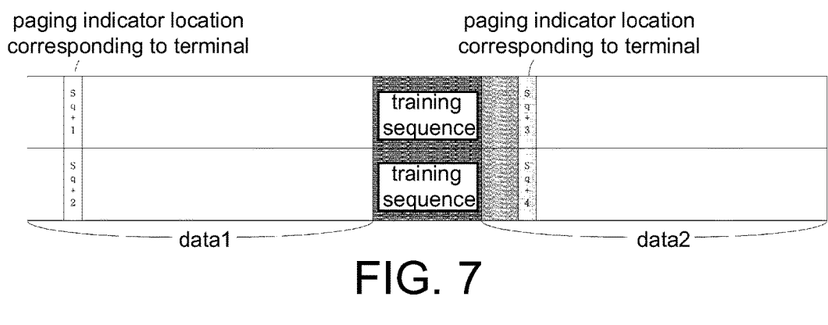
FIG. 7 is a schematic diagram of a third reception approach in a paging indicator transmission method according to an embodiment of the present invention.

In the third reception approach, the data received is as indicated by a shaded part in FIG. 7. The data received by the RF component of the terminal is the training sequence "midamble" in the timeslot where the paging indicator channel PICH is located, one paging indicator corresponding to the terminal, and the data between the training sequence "midamble" and the paging indicator. Preferably, before receiving the data, a time position of the paging indicator is first calculated (the size of an RF time window can be determined with a known location of the paging indicator in the timeslot), so that a paging sequence closer to the training sequence may be selected and received. That is, considering a time delay characteristic of wireless communication, the paging indicator at the half that is closer to the training sequence may be received.

Figure 8:
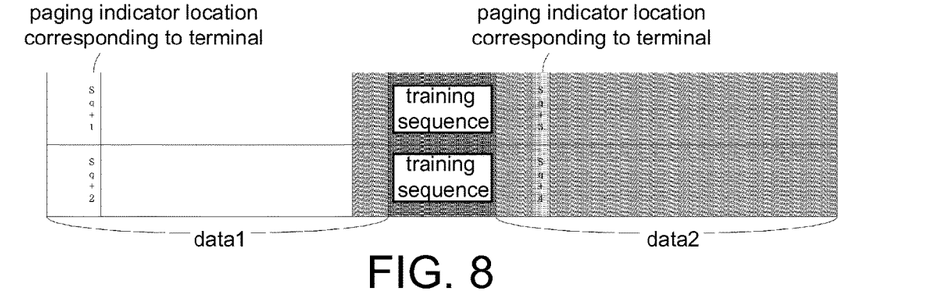
FIG. 8 is a schematic diagram of a fourth reception approach in a paging indicator transmission method according to an embodiment of the present invention.

Variations may be made to the three reception approaches above; that is, other data may be received apart from the data stated above. It should be noted such variations are also encompassed within the scope of the present invention. For example, for the first reception approach, apart from the data stated in the first reception approach, the data received further includes a part of data "data1", as shown in FIG. 8.

Figure 9:
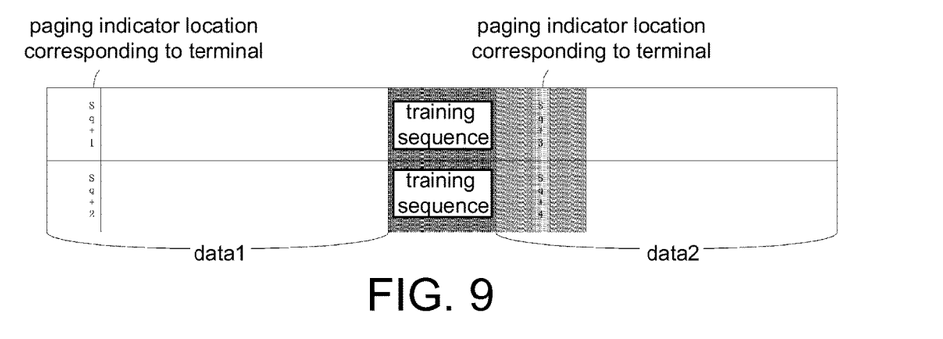
FIG. 9 is a schematic diagram of a fifth reception approach in a paging indicator transmission method according to an embodiment of the present invention.
Figure 10:
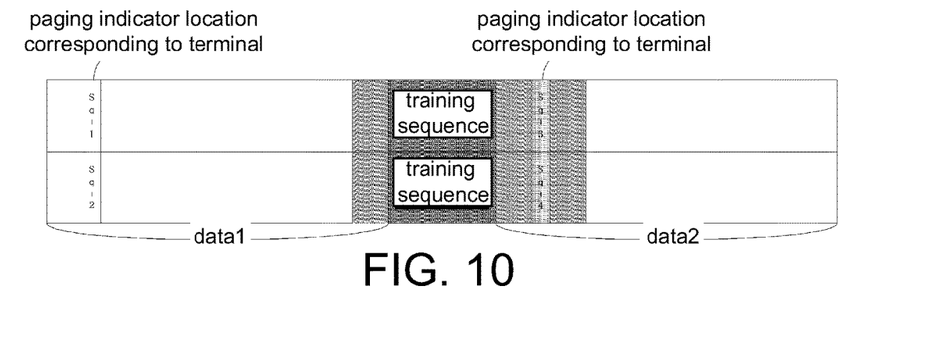
FIG. 10 is a schematic diagram of a sixth reception approach in a paging indicator transmission method according to an embodiment of the present invention.

The above variation is also applicable to the second reception approach and the third reception approach. Referring to FIGS. 9 and 10, the data received by the RF component of the terminal is the training sequence "midamble" in the timeslot where the paging indicator channel is located, and a part of data at one side or two sides of the training sequence "midamble". The part of data at one side or two sides of the training sequence "midamble" includes one paging indicator corresponding to the terminal, and the data between the training sequence and the paging indicator.

Figure 11:
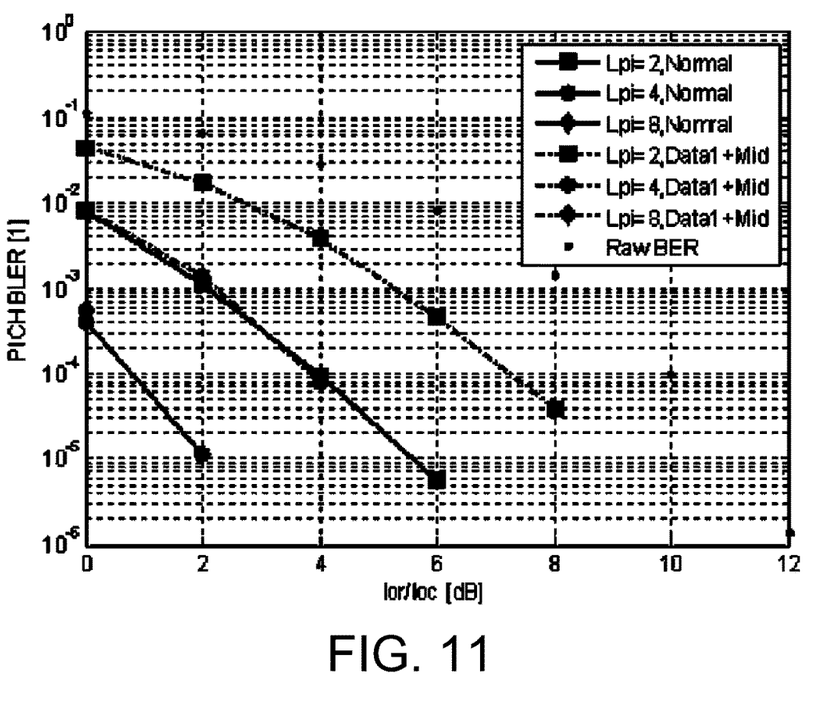
FIG. 11 is a schematic diagram of additive Gaussian white noise (AGWN) channel emulation.

In the first and third reception approaches, as a length of the paging indicator is reduced to a half of an original length, performance loss of substantially 3 dB is incurred. FIG. 11 shows a schematic diagram of additive white Gaussian noise (AWGN) channel emulation. Taking Lpi=2 for example, compared to normal reception, 3 dB performance loss is incurred when receiving a half of the data. Thus, cell signal quality may be first induced as priori information. That is to say, the solution of the present invention is adopted only when the cell signal quality satisfies a predetermined condition.

Preferably, before step S2, it is determined whether the cell signal quality is greater than a set value K. When the quality is greater than the set value K (set according to requirements), in step S2, the data received by the RF component of the terminal is the training sequence in the timeslot where the paging indicator PICH is located, one paging indicator corresponding to the terminal, and the data between the training sequence and the paging indicator (i.e., the third reception approach). Alternatively, the data received by the RF component of the terminal is the training sequence of the timeslot where the paging indicator channel PICH is located, and all the data at one side of the training sequence (i.e., the first reception approach).

When the quality is smaller than or equal to the set value K, in step S2, the data received by the RF component of the terminal includes two paging indicators, corresponding to the terminal, in the timeslot where the paging indicator channel PICH is located, and all the data between the two paging indicators, including the training sequence of the timeslot where the paging indicator channel PICH is located (i.e., the second reception approach).

Figure 12:
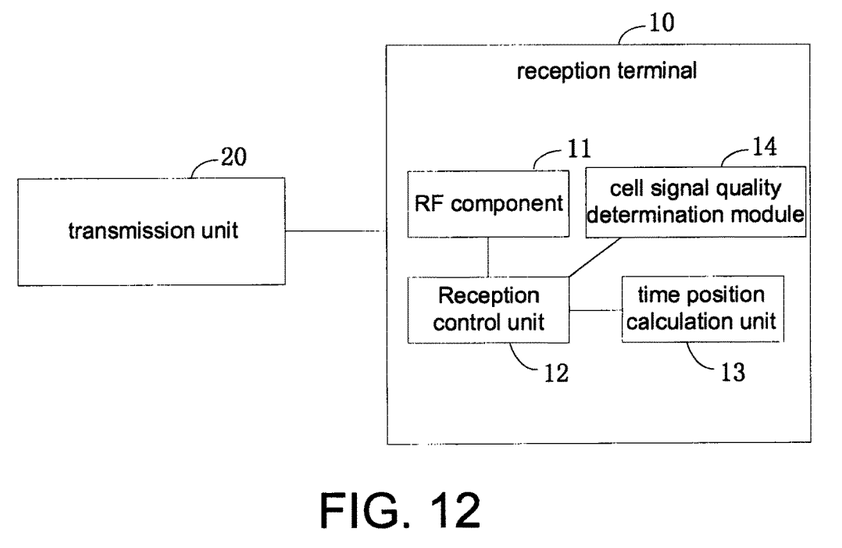
FIG. 12 is a schematic diagram of a paging indicator transmission system according to an embodiment of the present invention.

The paging indicator transmission method for a mobile communication system is as disclosed above. The present invention further discloses a paging indicator transmission system for a mobile communication system, as shown in FIG. 12. Referring to FIG. 12, the paging indicator transmission system includes a transmission device 20 and a reception terminal 10.

The transmission device 20 pages a set of terminals by grouping paging indicators, and carries a paging indicator PCH of each terminal by a paging indicator channel PICH. The paging indicator channel PICH of each cell utilizes the same burst structure, the paging indicators PCH are located at known locations at one side or two sides of a training sequence, and the paging indicators are coded by repeated coding. The training sequence is used for channel estimation.

The reception terminal 10 includes an RF component 11 and a reception control unit 12. The reception control unit 12 controls the RF component 11 to intermittently receive paging messages sent by the transmission device 20. The paging messages are from a network, and are carried on a paging indicator channel. Precise positions of paging indicators in the set may be obtained from system broadcast messages. The received data includes a training sequence in a timeslot where a paging channel PICH is located, one or two paging indicators corresponding to the terminal, and data between the training sequence and the one or two paging indicators corresponding to the terminal.

In the present invention, the above data may be received by three reception approaches. Referring to FIG. 5, in the first reception approach, the data received by the RF component controlled by the reception control unit is the training sequence in the timeslot where the paging indicator channel PICH is located, and all the data at one side of the training sequence.

Referring to FIG. 6, in the second reception approach, the data received by the RF component controlled by the reception control unit is two paging indicators, corresponding to the terminal, in the timeslot where the paging indicator channel PICH is located, and all the data between the two paging indicators, including the training sequence in the timeslot where the paging indicator channel PICH is located.

Referring to FIG. 7, in the third reception approach, the data received by the RF component of the terminal is the training sequence in the timeslot where the paging indicator channel PICH is located, one paging indicator corresponding to the terminal, and the data between the training sequence and the paging indicator.

In the reception approaches, preferably, the reception terminal 10 includes a time position calculation unit 13 for calculating time positions of the paging indicators at the two sides of the training sequence, and for selecting and receiving the paging indicator closer to the training sequence as a part of the received data.

Variations may be made to the three reception approaches above; that is, other data may be received apart from the data stated above. For example, for the first reception approach, apart from the data stated in the first reception approach, the data received further includes a part of data "data1", as shown in FIG. 8.

The above variation is also applicable to the second reception approach and the third reception approach. Referring to FIGS. 9 and 10, the data received by the RF component of the terminal is the training sequence "midamble" in the timeslot where the paging indicator channel PICH is located, and a part of data at one side or two sides of the training sequence "midamble". The part of data at one side or two sides of the training sequence "midamble" includes one paging indicator corresponding to the terminal, and the data between the training sequence and the paging indicator.

The reception terminal 10 further includes a cell signal quality determination module 14 for determining whether the cell signal quality is greater than a set value K. When the quality is greater than the set value K, the data received by the RF component controlled by the reception control unit includes the training sequence of the timeslot where the paging indicator PICH is located, one paging indicator corresponding to the terminal, and the data between the training sequence and the paging indicator. Alternatively, the data received by the RF component controlled by the reception control unit includes the training sequence of the timeslot where the paging indicator channel PICH is located, and all the data at one side of the training sequence.

When the quality is lower than or equal to the set value K, the data received by the RF component of the terminal includes two paging indicators, corresponding to the terminal, in the timeslot where the paging indicator channel PICH is located, and all the data between the two paging indicators, including the training sequence in the timeslot where the paging indicator channel PICH is located.

Second Embodiment

A paging indicator reception device for a mobile communication system is provided according to a second embodiment of the present invention. The paging indicator reception device includes an RF component and a reception control unit.

The reception control unit controls the RF component to intermittently receive paging messages, which are from a network and are carried on a paging indicator channel. The received data includes a training sequence in a timeslot where a paging channel PICH is located, one or two paging indicators corresponding to the terminal, and data between the training sequence and the one or two paging indicators corresponding to the terminal.

In the present invention, the above data may be received by three reception approaches. Referring to FIG. 5, in the first reception approach, the data received by the RF component controlled by the reception control unit is the training sequence in the timeslot where the paging indicator channel PICH is located, and all the data at one side of the training sequence.

Referring to FIG. 6, in the second reception approach, the data received by the RF component controlled by the reception control unit is two paging indicators, corresponding to the terminal, in the timeslot where the paging indicator channel PICH is located, and all the data between the two paging indicators, including the training sequence in the timeslot where the paging indicator channel PICH is located.

Referring to FIG. 7, in the third reception approach, the data received by the RF component controlled by the reception control unit is the training sequence in the timeslot where the paging indicator channel PICH is located, one paging indicator corresponding to the terminal, and the data between the training sequence and the paging indicator.

In the reception approaches, preferably, the reception terminal further includes a time position calculation unit for calculating time positions of the paging indicators at two sides of the training sequence and selecting the paging indicator closer to the training sequence as a part of the received data.

Variations may be made to the three reception approaches above; that is, other data may be received apart from the data stated above. For example, for the first reception approach, apart from the data stated in the first reception approach, the data received further includes a part of data "data1", as shown in FIG. 8.

The above variation is also applicable to the second reception approach and the third reception approach. Referring to FIGS. 9 and 10, the data received by the RF component of the terminal includes the training sequence "midamble" in the timeslot where the paging indicator channel is located, and a part of data at one side or two sides of the training sequence "midamble". The part of data at one side or two sides of the training sequence "midamble" includes one paging indicator corresponding to the terminal, and the data between the training sequence and the paging indicator.

The reception terminal further includes a cell signal quality determination module 14 for determining whether the cell signal quality is greater than a set value K. When the quality is greater than the set value K, the data received by the RF component controlled by the reception control unit includes the training sequence of the timeslot where the paging indicator PICH is located, one paging indicator corresponding to the terminal, and the data between the training sequence and the paging indicator. Alternatively, the data received by the RF component controlled by the reception control unit includes the training sequence of the timeslot where the paging indicator channel PICH is located, and all the data at one side of the training sequence.

When the quality is lower than or equal to the set value K, the data received by the RF component of the terminal includes two paging indicators, corresponding to the terminal, in the timeslot where the paging indicator channel PICH is located, and all the data between the two paging indicators, including the training sequence of the timeslot where the paging indicator channel PICH is located.

In conclusion, in the paging indicator transmission method and system for a mobile communication system disclosed by the present invention, characteristics of distribution and repeated coding of paging information in paging timeslots, known to a terminal, are repeated utilized to reduce the reception of unnecessary information, thereby reducing an operating time of the RF component and power consumption of the terminal as well as prolonging a standby period.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A paging indicator transmission method for a mobile communication system, comprising:
   step 1: paging a set of terminals by grouping paging indicators, and carrying paging indicators of each terminal by a paging indicator channel, wherein the paging indicator channel of each cell utilizes a same burst structure comprising a training sequence, and two paging indicators corresponding to each terminal, and the two paging indicators are located at known locations on opposite sides of the training sequence, respectively;
   step 2: determining whether a cell signal quality is greater than a set value K; and
   step 3: the terminal controlling an RF component thereof to receive only a part of data of the timeslot where the paging indicator channel is located, wherein
   when the cell signal quality is greater than the set value K, the part of the data received by the RF component of the terminal comprises the training sequence in the timeslot where the paging indicator PICH is located, and only one of the two paging indicators corresponding to the terminal; and
   when the cell signal quality is smaller than or equal to the set value K, the part of the data received by the RF component of the terminal comprises the two paging indicators corresponding to the terminal in the timeslot where the paging indicator channel is located, and all data between the two paging indicators including the training sequence of the timeslot where the paging indicator channel is located.

2. The paging indicator transmission method according to claim 1, wherein in step 3, when the cell signal quality is greater than the set value K, the data of the timeslot where the paging indicator channel is located received by the RF component of the terminal consists of the training sequence, the only one of the two paging indicators corresponding to the terminal, and data between the training sequence and the only one of the two paging indicators.

3. The paging indicator transmission method according to claim 2, wherein step 3 further comprises calculating a time position of the paging indicator before receiving the data, and selecting and receiving the paging indicator closer to the training sequence to be the only one of the two paging indicators.

4. The paging indicator transmission method according to claim 1, wherein in step 3, when the cell signal quality is greater than the set value K, the data of the timeslot where the paging indicator channel is located received by the RF component of the terminal consists of the training sequence and a part of data at one side of the training sequence, comprising the only one of the two paging indicators corresponding to the terminal, and data between the training sequence and the only one of the two paging indicators.

5. The paging indicator transmission method according to claim 1, wherein in step 3, when the cell signal quality is greater than the set value K, the data of the timeslot where the paging indicator channel is located received by the RF component of the terminal consists of the training sequence and all data at one side of the training sequence.

6. The paging indicator transmission method according to claim 1, wherein in step 3, when the cell signal quality is greater than the set value K, the data of the timeslot where the paging indicator channel is located received by the RF component of the terminal consists of the training sequence, a part of data at one side of the training sequence including the only one of the two paging indicators, and a part of data at the opposite side of the training sequence not including the second of the two paging indicators.

7. A paging indicator transmission system for a mobile communication system, comprising:
a transmission device, configured to page a set of terminals by grouping paging indicators, and carry the paging indicator of each terminal by a paging indicator channel, wherein the paging indicator channel of each cell utilizes a same burst structure comprising a training sequence, and two paging indicators corresponding to each terminal, the two paging indicators are located at known locations on opposite sides of the training sequence, respectively;
and
a reception terminal that intermittently receives paging messages sent by the transmission device and that receives only a part of data of the timeslot where the paging indicator channel is located, wherein
it is determined whether a cell signal quality is greater than a set value K;
when the cell signal quality is greater than the set value K, the data received comprises the training sequence in the timeslot where the paging indicator PICH is located, and only one of the two paging indicators corresponding to the terminal; and
when the cell signal quality is smaller than or equal to the set value K, the data received comprises the two paging indicators corresponding to the terminal in the timeslot where the paging indicator channel is located, and all data between the two paging indicators including the training sequence of the timeslot where the paging indicator channel is located.

8. The paging indicator transmission system according to claim 7, wherein when the cell signal quality is greater than the set value K, the data of the timeslot where the paging indicator channel is located received consists of the training sequence, the only one of the two paging indicators corresponding to the terminal, and data between the training sequence and the only one of the paging indicators.

9. The paging indicator transmission system according to claim 8, wherein the reception terminal calculates a time position of the paging indicator before receiving the data, and select and receive the paging indicator closer to the training sequence to be the only one of the two paging indicators.

10. The paging indicator transmission system according to claim 7, wherein the data of the timeslot where the paging indicator channel is located received consists of:
the training sequence and a part of data at one side of the training sequence comprising the only one of the two paging indicators corresponding to the terminal, and data between the training sequence and the only one of the two paging indicators;
the training sequence, and all data at one side of the training sequence; or
the training sequence, a part of data at one side of the training sequence including the only one of the two paging indicators, and a part of data at the opposite side of the training sequence not including the second of the two paging indicators.

11. A paging indicator reception device for a mobile communication system comprising a plurality of cells and terminals, whereby:
the paging indicator reception device intermittently receives paging messages from a network carried on a paging indicator channel and receives only a part of data of a timeslot where the paging indicator channel is located, wherein the paging indicator channel of each cell utilizes a same burst structure comprising a training sequence, and two paging indicators corresponding to each terminal, and the two paging indicators are located at known locations on opposite sides of a training sequence, respectively, wherein
it is determined whether a cell signal quality is greater than a set value;
when the cell signal quality is greater than a set value K, the data received comprises the training sequence in the timeslot where the paging indicator is located, and only one paging indicator of two corresponding to a terminal; and
when the cell signal quality is smaller than or equal to the set value K, the data received comprises the two paging indicators corresponding to the terminal in the timeslot where the paging indicator channel is located, and all data between the two paging indicators including the training sequence of the timeslot where the paging indicator channel is located.

12. The paging indicator reception device according to claim 11, wherein when the cell signal quality is greater than the set value K, the data of the timeslot where the paging indicator channel is located received consists of the training sequence, the only one of the two paging indicators corresponding to the terminal, and data between the training sequence and the only one of the paging indicators.

13. The paging indicator reception device according to claim 12, wherein the reception terminal calculates a time position of the paging indicator before receiving the data, and select and receive the paging indicator closer to the training sequence to be the only one of the two paging indicators.

14. The paging indicator reception device according to claim 11, wherein the data of the timeslot where the paging indicator channel is located received consists of:
the training sequence, and a part of data at one side of the training sequence comprising the only one of the two paging indicators corresponding to the terminal, and data between the training sequence and the only one of the two paging indicators;

the training sequence and all data at one side of the training sequence; or the training sequence, a part of data at one side of the training sequence including the only one of the two paging indicators, and a part of data at the opposite side of the training sequence not including the second of the two paging indicators.

\* \* \* \* \*